June 8, 1965 L. A. KRUMMECK 3,187,607
SPINNERET PRODUCTION
Filed July 24, 1962 3 Sheets-Sheet 1

INVENTOR
LUDWIG AUGUST KRUMMECK

BY
ATTORNEY

June 8, 1965  L. A. KRUMMECK  3,187,607
SPINNERET PRODUCTION
Filed July 24, 1962  3 Sheets-Sheet 2

INVENTOR
LUDWIG AUGUST KRUMMECK

BY *Harry C. Bradlich*
ATTORNEY

June 8, 1965  L. A. KRUMMECK  3,187,607
SPINNERET PRODUCTION

Filed July 24, 1962  3 Sheets-Sheet 3

INVENTOR
LUDWIG AUGUST KRUMMECK

BY *Harry C. Braddock*
ATTORNEY

3,187,607
SPINNERET PRODUCTION
Ludwig August Krummeck, Martinsville, Va., assignor to E. I. du Pont de Nemours and Company, Wilmington, Del., a corporation of Delaware
Filed July 24, 1962, Ser. No. 212,073
1 Claim. (Cl. 76—107)

This invention relates generally to the melt spinning of synthetic filaments of viscous organic materials and, as illustrated herein, relates more particularly to a method of generating a plurality of complex multiple passageway spinneret capillaries with punches that have relatively simple shapes.

In the preparation of spinneret capillaries or passageways as they will be referred to hereinafter, the procedure of punching a straight round passageway through the thickness of a spinneret blank or in a thick-wall spinneret, through the portion remaining after the blank has been counterbored, is known. The fabrication of slotted and irregular passageways by the method in which a number of round passageways are drilled in a line and in which the walls between the passageways are removed by broaching is also known. These procedures are time consuming and expensive. They require additional finishing steps, and they result in various imperfections such as drill rings and broach burrs in the walls of the finished passageways and spinneret orifices.

In the early prior art, the characteristics of fabric woven from a synthetic yarn were determined primarily by the chemical composition and the physical treatment given to the yarn's filaments. Generally, the cross-sectional shape of filaments was circular. In recent years, it has been found that the properties of a fabric can be changed radically by modifying the cross-sectional shape of the filament. Consequently, many different filament cross-sectional shapes are now highly desired ranging from the most simple to those having extremely complex shapes. This has necessitated improvements in the production of apparatus for controlling filament cross-sections during spinning.

Shaping of melt spinning solutions is principally a function of the configuration of the expression or extrusion orifices formed in a spinneret's extrusion face. These extrusion orifices, which may be many in number and of extremely small dimensions, are formed by the intersection of spinneret passageways (capillaries) and the spinneret's extrusion face. They are located at the exit ends of the passageways connecting with the spinneret's so-called melt face. Thus it is apparent that both orifice shape and passageway shape, at least that portion of the latter which conforms generally to the shape of the orifice, are extremely important to filament and, in turn, fabric characteristics. Of special interest and significance to the present invention are spinneret units which are provided with a plurality of groups of complex multiple passageways which groups of passageways each produce a single filament of complex cross-section.

The process of generating complex orifice shapes by using an electron beam to melt or erode the spinneret material away is known; however, this method leaves comparatively rough side walls, does not give extremely accurate dimensions, and the passageways are somewhat tapered. The limitations attendant to drilling processes involving the indexing of a workpiece have already been noted hereinbefore.

United States Letters Patent No. 3,017,789 granted January 23, 1962, to James S. Cobb discloses a process for producing irregularly shaped spinneret holes of precise dimensions by means of punching; however, the orifice and partial passageway shapes of the Cobb process are limited by the shape of the punch itself. The final orifice producing step of Cobb involves the formation of a unitary orifice conforming to the shape of the punch's perforating extremity. And finally, while it is well known generally to index and move a spinneret blank or workpiece so as to punch a plurality of single spinneret orifices in a desired somewhat uniform pattern on a spinneret plateface, such operations are also generally limited by the shapes of their punches as to the complexity of the orifices and complexity of filament cross-section produced thereby.

It is, accordingly, one object of the present invention to provide an improved process for the production of one or more groups of complex multiple extrusion orifices in a spinneret unit using simple, elementary tools and inexpensive process steps.

Another object of the invention is to provide an improved process for the production of groups of multiple slotted and other irregularly shaped extrusion orifices, for the formation of one filament per group in spinning, in which stamping, punching, and indexing steps alone are involved and in which no drilling or broaching as such are necessary.

A further object is to provide an improved process for producing groups of multiple spinneret passageways with extremely complex extrusion orifices and controlling the sizing of the orifices within dimensional tolerances previously thought impossible.

Still another object of this invention is to provide an improved process for rotating and translating both press punches and spinneret blanks relative one another, either individually and simultaneously or sequentially, so as to produce one or more groups of complex, multiple precise spinneret extrusion orifices, for the formation of one filament per group during spinning, by means of press punches having relatively simple shapes and by means of inexpensive process steps.

The objects of this invention are achieved by an arrangement wherein a workpiece holder containing a sufficiently thinned-wall fixed spinneret blank is operatively positioned in a series of locations or zones relative to the movable ram of a punch press; at each location or zone perforating the blank by means of a simply shaped punch held in a punch holding apparatus that is movably mounted on the ram, thus producing a segment of an orifice in the blank or one of the groups of passageways in a given multiple group; repositioning the punch by means of its mounting device, relative the fixed blank, while the blank is at each location, a predetermined number of times and distances and, at each reposition point, further perforating the blank so as to complete, at each location, production of a group of simple shaped orifices forming a predetermined complex multiple orifice for the spinning of a single complex cross-section filament during spinning, moving either the workpiece holder or the punch holding apparatus so as to change the relative positioning of the spinneret blank and the punch for the purpose of commencing production of additional groups of orifices at the different locations in the blank.

Other objects and advantages, will appear from a consideration of the following specification, claims, and the accompanying drawings in which:

Figure 1:
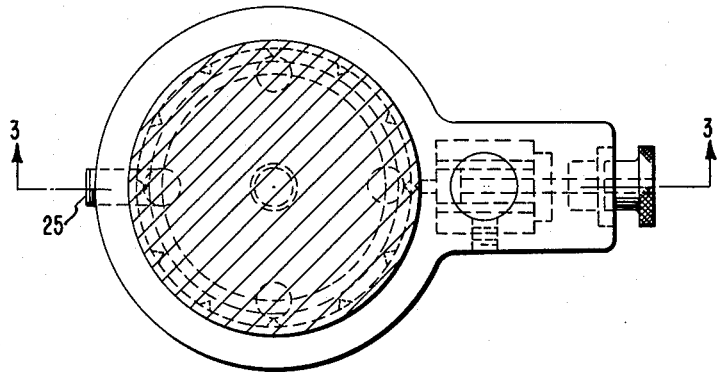
FIGURE 1 is a sectional plan view taken along line 1—1 of FIGURE 2 showing a press structure with a punch holding apparatus incorporating the construction of the present invention.

URE 1 taken substantially along the line 3—3 of FIGURE 1 and includes a partial sectional showing of a ram and a collet with a punch.

Figure 4:
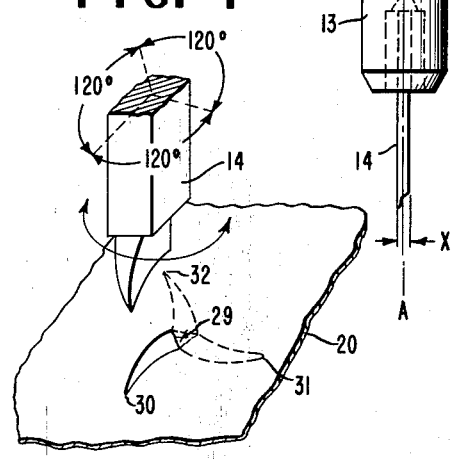

FIGURE 4 is a fragmentary perspective showing of a spinneret blank and one shape of die useful in performing the process of this invention.

Figure 5:
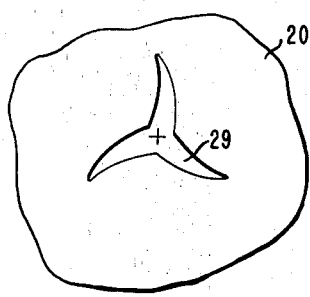

FIGURE 5 is a diagrammatic representation of a complex shaped orifice formed by the punch of FIGURE 4.

Figure 6:
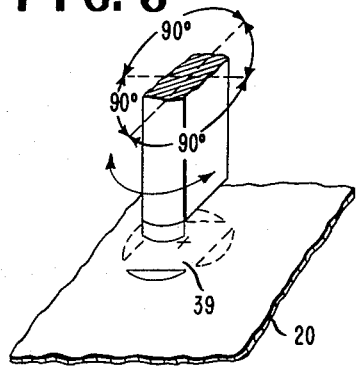

FIGURE 6 is another fragmentary perspective showing of a spinneret blank and a different shaped die from that shown in FIGURE 4.

Figure 7:
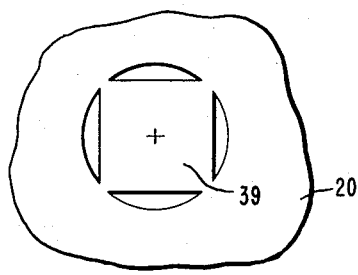
Figure 8:
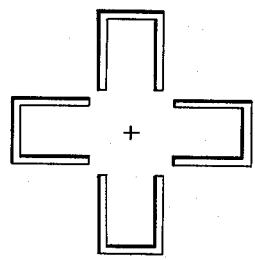
Figure 9:
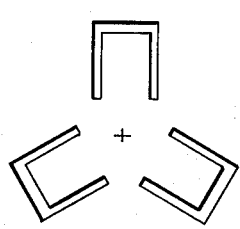
Figure 10:
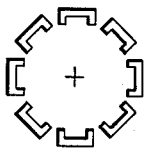
Figure 11:
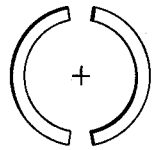
Figure 12:
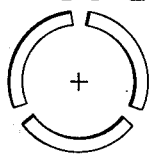
Figure 13:

FIGURE 7 is a diagrammatic representation of an orifice complex formed by the punch of FIGURE 6 and having small lands between the orifice segments.

FIGURES 8-19 show additional diagrammatic representations of complex shaped individual orifices which may be produced by the improved process and apparatus of this invention. The centers, or axis of symmetry, of each orifice complex or group of multiple orifices are denoted by a cross (+) in FIGURES 5, 7, and 8-19.

Figure 2:
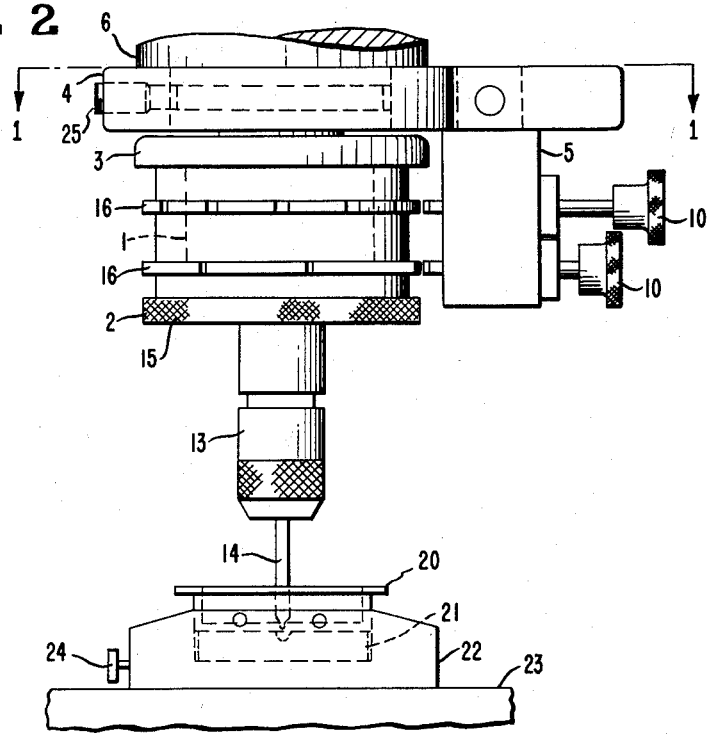
FIGURE 2 is an elevational view of the apparatus of FIGURE 1, including a punch press ram, a collet with a punch, a spinneret blank, a back-up plate, a workpiece holder, and other related parts.
Figure 3:
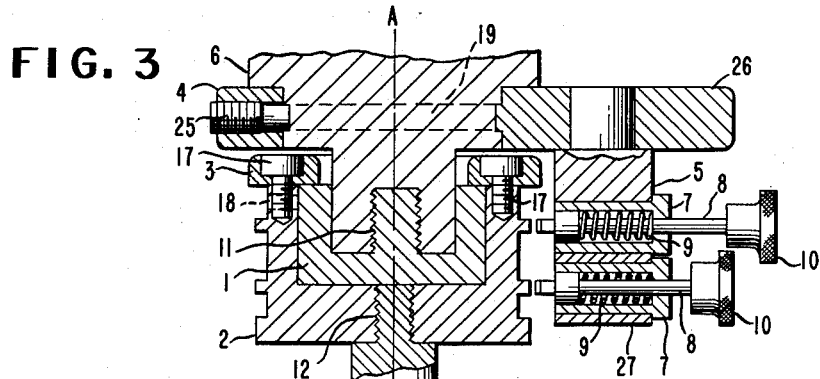
FIGURE 3 is a sectional view of the apparatus of FIG-

Referring now to the drawings wherein like characters of reference represent like structural elements in the various figures, the apparatus of this invention is best shown in FIGURES 2 and 3 wherein a removable sleeve stud 1 is attached to the linear reciprocating ram 6 (shown partially) of a punch press. This attachment is made by means of a threaded counter-bored hole in the working extremity of the ram 6 adapted to receive a threaded stud portion 11 of the sleeve stud 1. The ram 6 and the sleeve stud 1, the latter being made preferably from hardened and ground tool steel, form the basic supporting structure for the punch holding apparatus of this invention.

The punch holding apparatus shown in the embodiment of FIGURES 2 and 3 comprises essentially two independently rotatable assemblies. The first rotatable assembly comprises a punch indexing sleeve member 2 having integrally formed thereon a knurled peripheral section 15, or means for manually rotating the sleeve member 2, and indexing means 16 peripherally notched or indented to receive resiliently movable pawls 8. Alternately section 15 could be provided with gear teeth to be driven by a meshing drive gear of a drive mechanism not shown. The first rotatable assembly is further comprised of an annular thrust member 3 attached to the sleeve member 2 by means of suitable flat-head screws 17 engaged in appropriately drilled and tapped holes on the upper surface of the sleeve member 2. As shown, the sleeve member 2 and the thrust member 3 compressively surround the sleeve stud 1 so as to form a bearing surface lubricated by means of a suitable oil hole 18. Thus the sleeve member 2 and the thrust member 3 reciprocate, as a unit, in a linear direction (vertically as shown) with the linear reciprocating ram 6 and the sleeve stud 1; and, they are normally free to rotate about the non-rotatable ram 6 and stud 1 about an axis A—A.

The punch indexing sleeve member 2 has therein a threaded section 12 which is concentric with the upper bore portion of the sleeve member 2 and serves as means for removably mounting a punch 14. In the present embodiment a conventional collet 13 for holding the punch 14 is shown in threaded fixed engagement with the sleeve member 2.

A common axis exists for the ram 6, the sleeve stud 1 and its threaded stud section 11, the sleeve member 2 and its threaded section 12 for receiving the collet 13, the adjustable annular thrust member 3, the collet 13, and the punch 14. The punch 14 itself, or the punch 14 and the collet 13, may be provided with a horizontal slide plate (not shown) so as to permit some lateral movement. It has been found that by providing for limited lateral movement of the punch relative to the collet, or relative to member 2, additional complex orifices may be generated with relatively simple operational adjustment. Also, the indexing means 16 on the sleeve member 2 may take a form like that of a single graduated protractor ring. In the present embodiment, the indexing means 16 has an upper raised peripheral ring with a series of twelve notches spaced circumferentially each 30°. Its lower raised periphial ring has a lesser number of notches spaced at predetermined points intermediate the notches in the upper ring.

The second rotatable assembly comprises an adjustable collar member 4 secured in a circumferential groove portion 19 of the ram 6 by means of a set screw 25. This permits preoperatively determining the position of the collar member 4 about the common axis mentioned hereinabove and then locking the collar member 4 against further rotation prior to perforating movement of the punch 14. The collar member 4 has a beam portion 26 extending radially from the common axis which is drilled and reamed so as to be press fit about a pawl supporting assembly, generally designated by the numeral 5. Thus the pawl assembly 5 is movable with the collar member 4.

The pawl assembly 5 is further comprised of pawl bushings 7 slide fitted into suitable holes in the pawl pivot 27. Each bushing 7 contains therein a pawl 8 having attached thereto a knurled set knob 10 at one end and surrounded by a compression spring 9 fitted around the pawl 8 within the bushing 7. While the disclosed embodiment shows a double-pawl arrangement, it will be understood that a single-pawl arrangement may be used where only one raised peripheral ring 16 is desired to be engaged on the sleeve member 2. Thus resiliently movable means are provided for selective movement (by the knobs 10) of the pawls 8 into and out of locked engagement with the indexing means 16.

Once the adjustable collar member 4 is locked (against rotation) to the ram; the collar member 4 and the pawl supporting assembly 5 reciprocate in a linear direction with the ram 6, the sleeve stud 1, and the balance of the punch holding apparatus. Punches 14 for the punch holding apparatus of this invention usually have an off-center (off the common axis previously referred to) perforating tip allowing a total lateral displacement due to punch rotation generally indicated at "X" in FIGURE 3; however, this may be changed by inserting an adjustable jaw or slide plate in the threaded section 12 of the sleeve member 2 or other suitable means.

While the materials of construction of the punch holding apparatus are not necessarily critical, it is desirable to form the indexing sleeve member 2 and the annular thrust member 3 from hardened and ground tool steel and to form the pawls from hardened tool steel. The other elements may be made from a suitable metal such as steel.

In operation, a spinneret blank 20 is secured in place in a suitable workpiece holder 22 adjacent a back-up plate 21 of soft metal. The workpiece holder 22 is then positioned relative the common axis of the ram 6, the punch holding apparatus and the punch 14. This initial positioning may be accomplished either by rotation or translation, or both, of the workpiece holder 22 by suitable known means shown schematically at 24 for moving a workpiece holder (shown diagrammatically in FIGURE 2). The punch holding apparatus may then be optionally rotated or slightly translated over the surface of the spinneret blank 20 so as to achieve further refinement of relative positioning between the punch 14 and the blank 20. The pawl 8 is then moved into locking position so as to lock the indexing sleeve member 2 against rotation.

As shown, for example in FIGURE 4, a punching stroke of the ram 6 drives the punch 14 into the blank 20 to form a first segment 30 of a single orifice complex 29. The pawl 8 is then manually moved out of locking engagement with the indexing sleeve member 2 by means of the pawl set knob 10. The sleeve member 2 is rotated 120° about the center of the orifice complex by means of its peripheral section 15. The pawl 8 is relocked in a tooth of the indexing means 16, and a second punching stroke of the ram 6 drives the punch 14 into the blank 20 to form a second segment 31 of the single orifice complex 29. The latter procedure is once again followed to form the last segment 32 of the finished trilobal-shaped orifice complex 29 shown best in FIGURE 5. Thus a complex shaped orifice or a group of multiple orifices is capable of being produced from a relatively simple shaped offset punch. Optionally, either the workpiece holder 22 or the punch holding apparatus may be indexed or translated relative one another so as to change the positioning of the blank 20 and the punch 14 relative one another so as to commence production of additional complex orifices or groups of multiple orifices at different locations in the same spinneret blank 20.

FIGURES 6 and 7 show the formation of still another orifice complex 39 formed by a total of four punching strokes taken at 90° indexed intervals about the center point or axis (+) of the complex 39. The center points (+) of the cross-sectional shapes of orifice complexes shown in FIGURES 5 and 7 through 19 are the resultant intersection of the aforementioned common axis and a surface portion of the spinneret blank 20. It will be noted that, if an orifice with a cross-section as shown in FIGURE 7 were attempted by means of a single punching stroke, the punch would be extremely difficult to fabricate and the center section of extremely small lands would frequently be removed during punching. Hence, this would result in the production of an unusable spinneret.

The delicacy and precision of the complex orifices and groups of multiple orifices which can be made with this novel arrangement can best be seen from an examination of the critical dimensions for FIGURES 8 to 12. In these somewhat varying shaped orifice complexes the width of the punched segments are within the range of .003 to .005 inch, the length within .019 to .050 inch, and the span of each complex falls within a .050 to .100 inch diameter circle. Smaller or larger dimensions than these described examples are possible of attainment with the arrangement of this invention.

Figure 14:
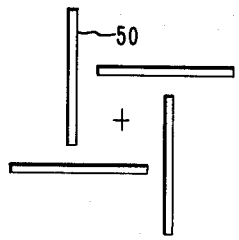

Referring now to FIGURE 14, if a punch having a perforating tip with a cross-sectional shape as indicated by 50 were used to form orifice segment 50 it could then be successively rotated 90°, using the center as indicated at (+) as a center of rotation, to perforate the entire orifice complex of FIGURE 14.

Figure 15:
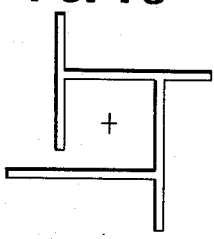

The orifice complex of FIGURE 15 can be generated by using a punch 14 with a T-shaped perforating tip and indexing it twice 90° each time. For example, if the first step were to punch the top T with the height of the T being horizontal and the cross of the T being vertical, then on the second step the cross of the T would not remove any metal but would fall into the section previously removed. Similarly, on the third step the same thing would happen.

Figure 16:
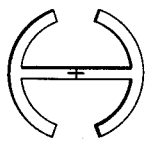

For the orifice complex shown in FIGURE 16, it would be possible to use a punching tool 14 which would be one-half of the complex. However, it has been found to be better to use a punch 14 in which the curved portion is similar to one-half of the orifice complex but where the horizontal leg would be two thirds or three-quarters of the horizontal distance between the two end portions.

Figure 17:
Figure 18:
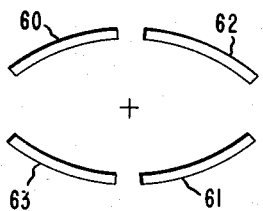
Figure 19:
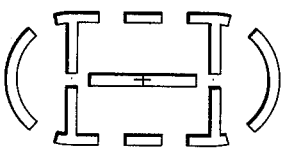

A single punch 14 is used five times for the orifice complex of FIGURE 17. The orifice complex of FIGURE 18 is made with two punches 14, one the mirror image of the other. Note that a punch 14 formed to generate orifice segment 60 when rotated 180° would make orifice segment 61 while a punch 14 which is the mirror image of the first punch 14 would generate orifice segments 62 and 63. Similarly, two punches would be required for the orifice complex shown in FIGURE 19.

It should be noted that the disclosed complex orifices or groups of orifices are only typical examples of utilizing the arrangement of this invention. One skilled in this art would be expected to generate numerous other variations using this process. In the foregoing discussions, a single segmental perforating action has been assumed for a thin-wall spinneret blank 20. However, this process could also be used in the making of orifice complexes in thick spinnerets blanks 20 such as those to be used in the melt spinning of nylon, etc., wherein a flat-bottomed counterbore is first made and then a compex orifice is generated by indexing the punch 14 using one of the described punching processes.

One method of preparing to make a complex spinneret orifice in a thick-wall spinneret blank 20 is to use Cobb's aforementioned process wherein the thickness of the spinneret blank 20 is reduced by drilling a counterbore or recessing the plate or blank, stamping into the recess with a wedge-shaped punch tapered in the direction of its advance, and removing the deformation or protuberance left on the melt face of the spinneret blank 20. Then using the process of this invention each segment of the orifice complex would be punched indexing the punch 14 the desired number of times to form a number of protuberances. These protuberances could be removed after each individual orifice segment was formed but in the interest of economy of time all the orifices in a spinneret blank would be punched before any protuberances were removed.

With this arrangement it is now possible to generate complex orifices that are not limited by the shape of the perforating punch 14 itself. Although the punch 14 is rotated about a common central axis, it is possible to make asymmetric orifice complexes, such as in FIGURE 14, as well as symmetrical complexes. The orifice complex may be an array or group of separated perforations, such as in FIGURES 7 to 12, 14, and 17 to 19, or a unitary complicated orifice, such as in FIGURES 5, 13, 15, and 16. The punching bit 14 may be changed between individual perforating strokes to provide differently shaped orifice cross-sections, such as FIGURES 18 and 19. Thus this arrangement permits fabrication of intricate spinneret orifice complexes that would be delicate and extremely costly to produce, if not physically impossible, with a single punching stroke. A simple punching tool 14 can be made more precisely, is stronger, and will punch more passageways with greater accuracy and reduce the cost of the spinneret. Also, by the use of a simple punch form, it is possible to make a passageway which is straight-walled for a longer section than would be possible when attempting to use a single complex punch.

In accordance with the patent laws, a preferred arrangement of this invention has been disclosed in detail. Numerous changes and modifications within the spirit of the invention will occur to those skilled in the art and all such are considered to fall within the scope of the following claim wherein.

What is claimed is:

In the production of thick-wall spinnerets, the improvement comprising the steps of forming a plurality of recesses of circular transverse cross section on a stationary spinneret blank; positioning an indexable punch holder so that the axis of rotation of said holder is aligned with the center of an orifice complex to be generated in a recess; perforating the spinneret blank in the bottom of the recess in a single punch stroke to form a punch-shaped perforated segment portion of an orifice complex in the blank; and successively indexing the punch holder to new positions in the recess and further perforating the blank to complete a predetermined orifice complex in the recess, and moving the blank to relatively position said punch holder axis of rotation sequentially at the other recesses, and repeating the indexing and perforating steps at each recess.

(References on following page)

References Cited by the Examiner

UNITED STATES PATENTS

| | | | |
|---|---|---|---|
| 1,476,246 | 12/23 | Gray | 83—640 |
| 1,604,216 | 10/26 | Brainin | 76—107 |
| 1,654,936 | 1/28 | Jones | 76—107 |
| 1,903,234 | 3/33 | Gray | 83—556 |
| 2,148,221 | 2/39 | Schneider | 76—107 |
| 2,605,836 | 8/52 | Messick | 83—640 |
| 3,017,789 | 1/62 | Cobb | 76—107 |

GRANVILLE Y. CUSTER, JR., *Primary Examiner.*

FRANK E. BAILEY, ARTHUR M. HORTON,
*Examiners.*